L. GRANGER.
FRUIT-DRIER.
No. 187,844. Patented Feb. 27, 1877.
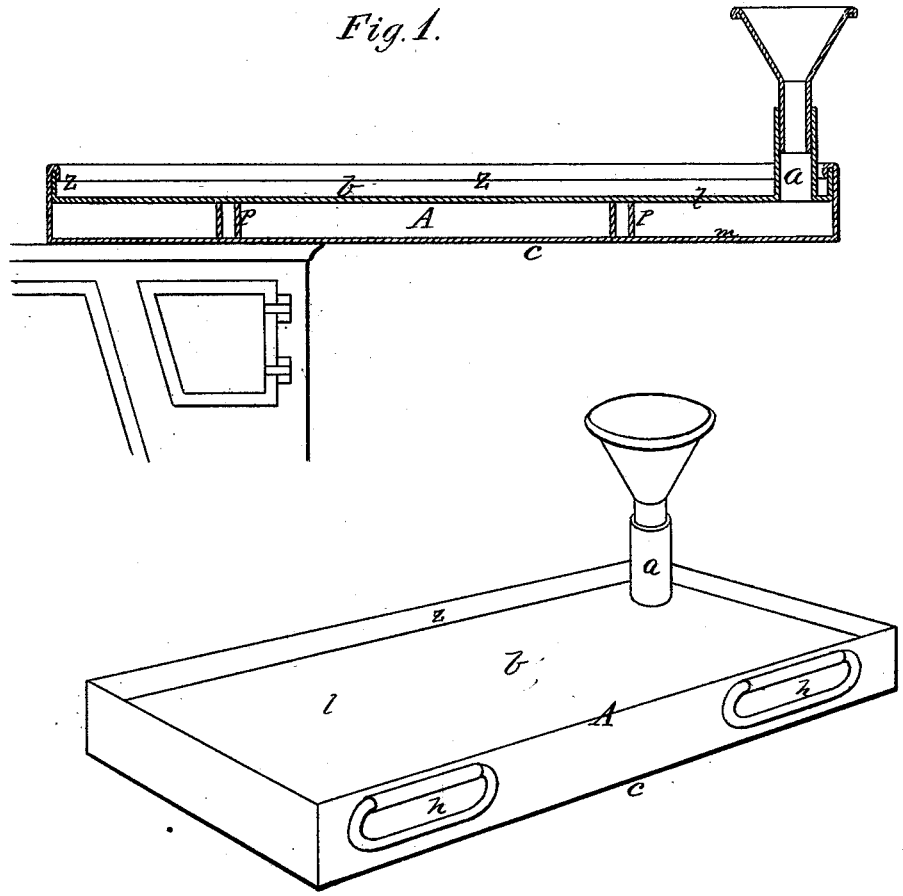

UNITED STATES PATENT OFFICE.

LEWIS GRANGER, OF ARMADA, MICHIGAN.

IMPROVEMENT IN FRUIT-DRIERS.

Specification forming part of Letters Patent No. 187,844, dated February 27, 1877; application filed January 6, 1877.

*To all whom it may concern:*

Be it known that I, LEWIS GRANGER, of Armada, in the county of Macomb, and State of Michigan, have invented a new and valuable Improvement in Fruit and Vegetable Driers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical longitudinal section of this invention. Fig. 2 is a perspective view of the same.

This invention has relation to improvements in devices for drying fruits, vegetables, and the like, by artificial heat.

The object of the invention is to devise an apparatus of a simple economical nature that will thoroughly dissipate all the aqueous parts of the fruit and arrest vinous fermentation, and at the same time be incapable of burning or crisping the fruit.

The nature of the invention consists in a water-tight vessel, having flat upper and lower surfaces, adapted to rest upon a stove, and provided with a pipe, through which water will be introduced into its interior, which vessel will be partly filled with water, which, being raised to the boiling-point, will generate steam, and gradually dry out the watery constituents, by heating the upper surface of the said vessel upon which the fruit or other articles to be desiccated are placed, as will be hereinafter more fully explained.

In the annexed drawings, the letter A designates my desiccating-boiler, which will be generally of rectangular form, and from two and one-half to four inches deep. This vessel or boiler will be steam and water tight, and will be provided with a pipe, $a$, through which the latter will be introduced into its interior, and from which the steam, when in excess, will escape into the open air. The upper and lower surfaces of the vessel will be flat, as shown at $b$ $c$, respectively, the former being for the purpose of spreading the article to be desiccated thereon, and the latter that the vessel may lie flat upon the stove. A guard-rim, $z$, and handles $h$ are also provided. Internally it is designed to be strengthened by vertical posts $p$ between the top $l$ and bottom $m$. I use my boiler or desiccator as follows: One of its ends will lie across an ordinary stove or furnace and its contents will then be gradually raised to the boiling-point, its remaining end being supported by a suitable stand. The vessel being only partly filled with water a space above its surface will be left for the steam, which, being tempered by the radiation of heat from the upper surface $b$, will never reach so high a temperature as to cook, burn, or crisp the fruit, but by its moderate heat will gradually and slowly desiccate the same—that is, will expel all its watery particles without impairing its flavor. Thus the most delicate fruits and vegetables may be desiccated to advantage, which heretofore have been deemed unsuited to this purpose, such as pine-apples, and the like.

All the fruits and vegetables usually desiccated for preservation, such as potatoes, apples, peaches, and many varieties of berries and plums, may be and have been successfully dried by my improved apparatus.

Having thus described my invention, what I claim is—

The combination of the steam or water chamber A, drying-pan $b$, supported by the posts P, escape-pipe $a$, and handles $h$, the whole adapted as described, for use in connection with a cooking or other stove.

In testimony that I claim the above I have hereunto subscribed my name in the presence of two witnesses.

LEWIS GRANGER.

Witnesses:
A. S. HALL,
FRED. B. FROST.